(12) United States Patent
Yamaguchi

(10) Patent No.: US 7,468,823 B2
(45) Date of Patent: Dec. 23, 2008

(54) OPTICAL BEAM SCANNING DEVICE, IMAGE FORMING APPARATUS AND LENS

(75) Inventor: Masao Yamaguchi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 370 days.

(21) Appl. No.: 11/197,451

(22) Filed: Aug. 5, 2005

(65) Prior Publication Data
US 2007/0030497 A1 Feb. 8, 2007

(51) Int. Cl.
*G02B 26/08* (2006.01)
(52) U.S. Cl. .................... 359/205; 347/259
(58) Field of Classification Search .......... 359/205–207
See application file for complete search history.

(56) References Cited

U.S. PATENT DOCUMENTS

| 6,667,757 | B2 | 12/2003 | Yamaguchi et al. | |
|---|---|---|---|---|
| 6,785,030 | B2 * | 8/2004 | Ishihara | 359/212 |
| 6,839,076 | B2 | 1/2005 | Yamaguchi | |
| 6,888,655 | B2 | 5/2005 | Yamaguchi | |
| 7,164,517 | B2 * | 1/2007 | Fujino | 359/207 |

| 2002/0014582 | A1 * | 2/2002 | Yamawaki | 250/234 |
|---|---|---|---|---|

FOREIGN PATENT DOCUMENTS

| JP | 2002-328323 A | 11/2002 |
|---|---|---|
| JP | 2005-024958 A | 1/2005 |
| JP | 2005-049506 A | 2/2005 |
| JP | 2005-049509 A | 2/2005 |
| JP | 2005-062399 A | 3/2005 |

OTHER PUBLICATIONS

U.S. Appl. No. 10/401,879, filed Mar. 31, 2003, Yamaguchi.
U.S. Appl. No. 10/959,075, filed Oct. 7, 2004, Yamaguchi.
U.S. Appl. No. 11/197,393, filed Aug. 5, 2005, Yamaguchi.
Beiser, L., "Laser Scanning Notebook," SPIE Optical Engineering Press, Nov. 1992.

* cited by examiner

*Primary Examiner*—James Phan
(74) *Attorney, Agent, or Firm*—Foley & Lardner LLP

(57) ABSTRACT

An optical beam scanning device of the invention includes a single light deflection device, a pre-deflection optical system which causes a light beam emitted from a light source to be incident to the light deflection device, and a post-deflection optical system which images the light beam, reflected from the light deflection device, onto a scanned surface. In the optical beam scanning device, an alignment surface to which the lens is fitted is located near a main scanning direction line passing through a midpoint of a maximum section thickness of the lens in at least one lens in one or the plurality of lenses constituting the post-deflection optical system.

2 Claims, 10 Drawing Sheets

OPTICAL BEAM SCANNING DEVICE, IMAGE FORMING APPARATUS AND LENS

BACKGROUND OF THE INVENTION

The present invention relates to an image forming apparatus such as a laser printer and a digital copying machine, an optical beam scanning device used for the image forming apparatus, and a lens. Particularly the invention relates to an overillumination scanning optical system whose width in a main scanning direction of incident light flux into a polygon mirror is broader than a plane width in the main scanning direction of the polygon mirror.

An optical beam scanning device is used in the laser printer apparatus, the digital copying machine, and the like which are of an electrostatic copying type image forming apparatus, in which an electrostatic latent image is formed with a laser beam and a visualized (developer) image is obtained by developing the electrostatic latent image. In the optical beam scanning device, the image (original image) to be output is divided into a first direction and a second direction orthogonal to the first direction, and a light beam whose light intensity is changed is repeatedly output in a substantially linear shape at predetermined time intervals based on image data in either the separated first or second direction, i.e., the light beam is scanned. The image corresponding to the original image is obtained by moving a recording medium or a latent image bearing body at constant speed in the direction orthogonal to the scanned light beam during a time interval between the scannings of the one-line light beam and the subsequent one-line light beam or during the scanning of the one line.

In the optical beam scanning device, the first direction in which the light beam is scanned is usually referred to as main scanning direction. The second direction orthogonal to the first direction is usually referred to as a sub-scanning direction. In the image forming apparatus, the sub-scanning direction corresponds to a transfer material conveying direction, and the main scanning direction corresponds to the direction perpendicular to the conveying direction in a transfer material plane. In the image forming apparatus, an image surface corresponds to the transfer material surface, and an imaging surface corresponds to a surface on which the beam is actually imaged.

In the above image forming apparatus and optical beam scanning device, generally the following relationship holds among image process speed (for example, conveying speed of the recording medium such as paper or the latent image bearing body), image resolution, motor revolving speed, and the number of planes of a polygon mirror:

$$P \times R = \frac{25.4 \times Vr \times N}{60} \quad (1)$$

where
P (mm/s): process speed (sheet conveying speed),
R (dpi): image resolution (the number of dots per inch),
Vr (rpm): the number of revolutions of polygon motor, and
N: the number of planes of polygon mirror.

From the equation (1), it is found that the process speed (namely, print speed) and the image resolution are proportional to the number of planes of the polygon mirror and the number of revolutions of the polygon motor. Therefore, in order to realize speed enhancement and high resolution of the image forming apparatus, it is necessary that the number of planes of the polygon mirror is increased and the number of revolutions of the polygon motor is increased.

In underillumination type (generic term when compared with the overillumination type) optical beam scanning devices which are currently used in many image forming apparatuses, the width (cross-sectional beam diameter, or beam diameter when the main scanning direction differs from the sub-scanning direction in the width) in the main scanning direction of the light beam (light flux) incident to the polygon mirror is limited so as to be smaller than the width in the main scanning direction of an arbitrary reflection plane of the polygon mirror. Accordingly, the light beam guided to each reflection plane of the polygon mirror is entirely reflected by the reflection plane.

On the other hand, the cross-sectional beam diameter (beam diameter in the main scanning direction when the main scanning direction differs from the sub-scanning direction in the diameter) of the light beam guided to the recording medium or the latent image bearing body (image surface) is proportional to an F number Fn of an imaging optical system. At this point, the F number Fn can be expressed by Fn=f/D, where f is a focal distance of the imaging optical system and D is a diameter in the main scanning direction of the light beam in an arbitrary reflection plane of the polygon mirror.

Accordingly, in order to enhance the resolution, when the cross-sectional beam diameter of the light beam is decreased on a scanning subject (image surface), i.e., the recording medium or the latent image bearing body, it is necessary to increase the cross-sectional beam diameter in the main scanning direction in each reflection plane of the polygon mirror. Therefore, when both the plane width of each reflection plane of the polygon mirror and the number of reflection planes are increased, the polygon mirror becomes enlarged. When the large polygon mirror is rotated at high speed, a large motor having a large torque is required, which results in cost increase in the motor, the increases in noise and vibration, and heat generation. Therefore, the countermeasures against these problems are required.

On the contrary, in the overillumination type optical beam scanning device, the width in the main scanning direction of the light beam with which each reflection plane of the polygon mirror is irradiated is set so as to be larger than the width in the main scanning direction of each reflection plane of the polygon mirror, so that the light beam can be reflected by the total plane of each reflection plane. Accordingly, the number of reflection planes of the polygon mirror, the image formation speed, and the image resolution can be increased without increasing the dimension of the polygon mirror, particularly the diameter beyond necessity. Further, in the overillumination type optical beam scanning device, the total diameter of the polygon mirror itself can be decreased, and the number of reflection planes can be increased. Therefore, in the overillumination type optical beam scanning device, a shape of the polygon mirror comes close to a circle and the air resistance is decreased, so that a polygon mirror load is decreased, the noise and the vibration are suppressed, and the heat generation can be suppressed when compared with the underillumination type. Further, since the countermeasure components such as glass required to decrease the noise and vibration can be eliminated or the number of countermeasure components can be decreased, there is also a cost-down effect in the overillumination type optical beam scanning device. Further, a high-duty cycle can be realized. For example, the overillumination scanning optical system is described in Laser Scanning Notebook (Leo Beiser; SPIE OPTICAL ENGINEERING PRESS).

When the optical beam scanning device is formed by one imaging lens (usually referred to as fθ lens), a fluctuation in section thickness is increased. When rotation about a main scanning axis is generated in the case where an imaging-lens fitting error exists, there is a problem that a lens surface fluctuation amount is increased because of a long distance to the lens surface and thereby an optical property of the imaging lens is largely worsened.

SUMMARY OF THE INVENTION

An object of the invention is to determine a lens fitting position which can decrease the lens surface fluctuation amount by the rotation generated about the main scanning direction axis such that the good lens optical property is obtained.

An optical beam scanning device of the invention includes a single light deflection device; a pre-deflection optical system which causes a light beam emitted from a light source to be incident to the light deflection device; and a post-deflection optical system which images the light beam, reflected from the light deflection device, onto a scanned surface, wherein an alignment surface to which the lens is fitted is located near a main scanning direction line passing through a midpoint of a maximum section thickness of the lens in at least one lens in one or the plurality of lenses constituting the post-deflection optical system.

An image forming apparatus of the invention includes an optical beam scanning device, a photosensitive body in which an image is formed by a light beam scanned by the optical beam scanning device, and a developing device which develops the image formed on the photosensitive body, wherein the optical beam scanning device includes a single light deflection device; a pre-deflection optical system which causes a light beam emitted from a light source to be incident to the light deflection device; and a post-deflection optical system which images the light beam, reflected from the light deflection device, onto a scanned surface, and an alignment surface to which the lens is fitted is located near a main scanning direction line passing through a midpoint of a maximum section thickness of the lens in at least one lens in one or the plurality of lenses constituting the post-deflection optical system.

A lens of the invention constitutes a post-deflection optical system of an optical scanning device, wherein an alignment surface to which the lens is fitted is located near a main scanning direction line passing through a midpoint of a maximum section thickness of the lens.

DESCRIPTION OF THE EMBODIMENTS

An embodiment of the invention will be described in detail below with reference to the accompanying drawings.

Figure 1:
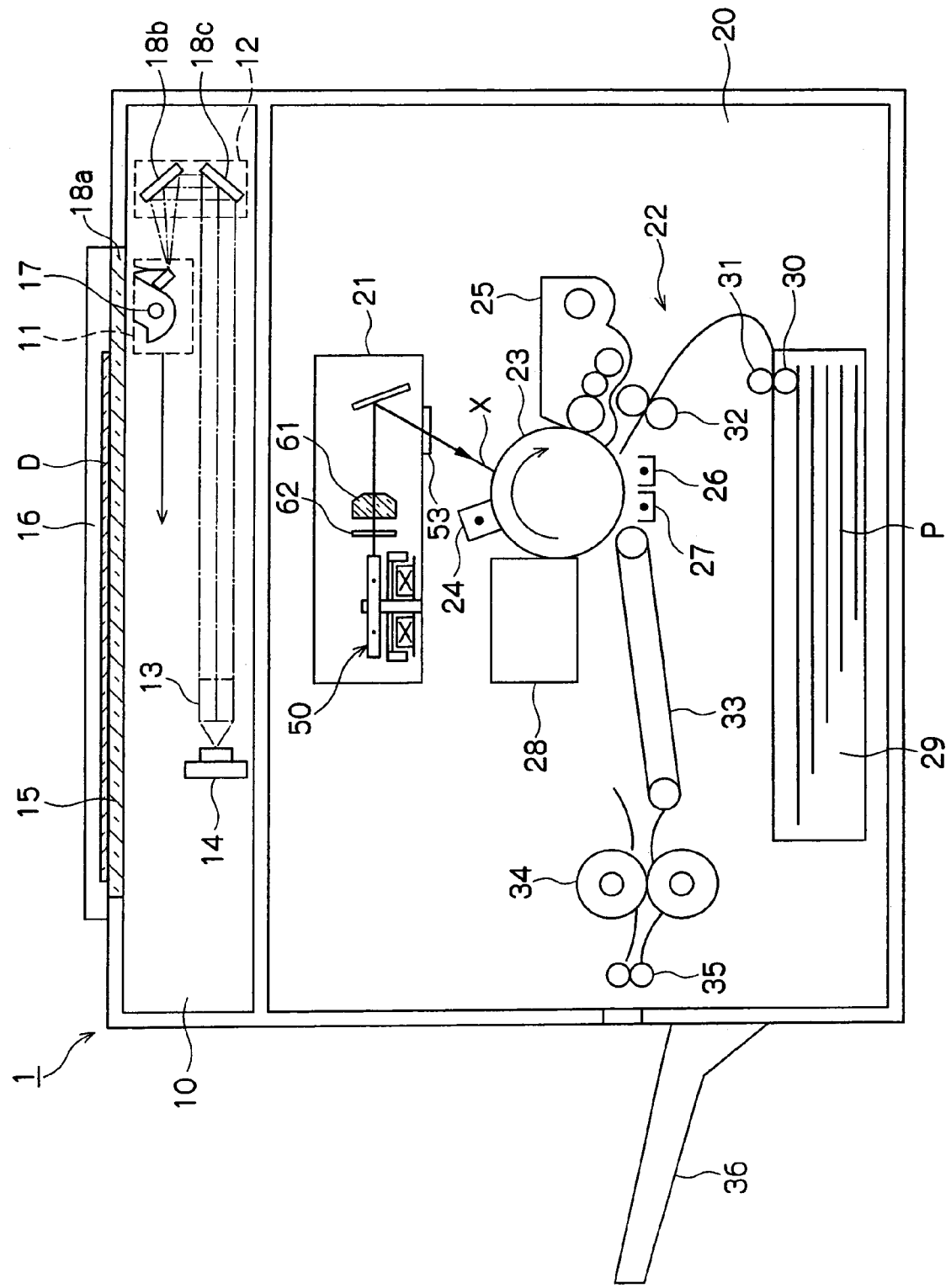
FIG. 1 is a schematic sectional view of an image forming apparatus having an optical beam scanning device of an embodiment.

FIG. 1 shows a digital copying machine which is of an image forming apparatus having an optical beam scanning device according to an embodiment of the invention.

As shown in FIG. 1, for example, a digital copying machine 1 has a scanner unit 10 which is of image reading means and a printer unit 20 which is of image forming means.

The scanner unit 10 includes a first carriage 11, a second carriage 12, an optical lens 13, a photoelectric conversion element 14, an original glass plate 15, and an original fixing cover 16. The first carriage 11 is formed while being movable in an arrow direction. The second carriage 12 is moved while driven by the first carriage 11. The optical lens 13 imparts a predetermined imaging property to the light from the second carriage 12. The photoelectric conversion element 14 outputs an electric signal by performing photoelectric conversion of the light to which the predetermined imaging property is imparted by the optical lens 13. The original glass plate 15 holds an original D. The original fixing cover 16 presses the original D against the original glass plate 15.

A light source 17 and a mirror 18a are provided in the first carriage 11. The light source 17 illuminates the original D. The mirror 18a reflects the light reflected from the original D, which is illuminated with the light emitted from the light source 17, toward the second carriage 12.

The second carriage 12 has a mirror 18b and a mirror 18c. The light transmitted from the mirror 18a of the first carriage 11 is folded 90° by the mirror 18b. The light folded by the mirror 18b is further folded 90° by the mirror 18c.

The original D placed on the original glass plate 15 is illuminated by the light source 17, and the light is reflected from the original D. In the reflected light, a variation of light and shade is distributed according to presence or absence of the image. The light reflected from the original D which is of image information on the original D is incident to the optical lens 13 through the mirrors 18a, 18b, and 18c.

The light, reflected from the original D and guided to the optical lens 13, is focused onto a light-reception surface of the photoelectric conversion element (CCD sensor) 14 by the optical lens 13.

When a start of the image formation is input from an operation panel or an external device (not shown), the first carriage 11 and the second carriage 12 are driven by a carriage drive motor (not shown) and tentatively moved to a home position where a predetermined positional relationship is established between the original glass plate 15 and the first and second carriages 11 and 12, and then the first and second carriages 11 and 12 are moved at constant speed along the original glass plate 15. Therefore, the image information on the original D, i.e. the image light reflected from the original D is cut off with a predetermined width along the mirror 18a extending direction, i.e., the main scanning direction, and the image information on the original D is reflected toward the mirror 18b. At the same time, the image information on the original D is sequentially taken out as a unit of the width cut off by the mirror 18a with respect to the direction orthogonal to the mirror 18a extending direction, i.e., the sub-scanning direction, which allows all the pieces of image information on the original D to be guided to the CCD sensor 14. The electric signal output from the CCD sensor 14 is an analog signal, and the analog signal is converted into a digital signal by an A/D converter (not shown) and tentatively stored as the image signal in an image memory (not shown).

Thus, the image in the original D placed on the original glass plate 15 is converted by the CCD sensor 14 into, e.g., the 8-bit digital image signal indicating image density in each line along a first direction in which the mirror 18a extends by an image processing unit (not shown).

The printer unit 20 includes an optical beam scanning device 21 and an electrophotographic image forming unit 22. The optical beam scanning device 21 is an exposure device which is described later with reference to FIG. 2 and FIG. 3. The image forming unit 22 can form the image on a recording sheet P which is of an image forming medium.

The image forming unit 22 has a drum-shaped photosensitive body (hereinafter referred to as photosensitive drum) 23, a charging device 24, a developing device 25, a transfer device 26, a separation device 27, and a cleaning device 28. The photosensitive drum 23 is rotated by a main motor described later with reference to FIG. 3 such that an outer surface of the photosensitive drum 23 is moved at a constant speed, and an electrostatic latent image corresponding to the image data, i.e., the image of the original D is formed on the photosensitive drum 23 by irradiating the photosensitive drum 23 with a laser beam L from the optical beam scanning device 21. The charging device 24 imparts a surface potential having a predetermined polarity to the surface of the photosensitive drum 23. The developing device 25 performs development by selectively supplying toner of a visualization material to the electrostatic latent image which is formed on the photosensitive drum 23 by the optical beam scanning device. The transfer device 26 transfers the toner image, formed on the outer surface of the photosensitive drum 23 by the developing device 25, to the recording sheet P by imparting a predetermined electric field to the toner image. The separation device 27 separates the toner, located between the recording sheet P to which the toner image has been transferred with the transfer device and the photosensitive drum 23, from the photosensitive drum 23 by releasing the toner from the electrostatic adsorption to the photosensitive drum 23. The cleaning device 28 removes the transfer residual toner remaining on the outer surface of the photosensitive drum 23 to return a potential distribution of the photosensitive drum 23 to the state before the surface potential is supplied with the charging device 24. The charging device 24, the developing device 25, the transfer device 26, the separation device 27, and the cleaning device 28 are arranged in order along an arrow direction in which the photosensitive drum 23 is rotated. A predetermined position X on the photosensitive drum 23 between the charging device 24 and the developing device 25 is irradiated with the laser beam L from the optical beam scanning device 21.

The signal of the image read from the original D with the scanner unit 10 is converted into a print signal through processes such as an outline correction process and a gray level process for half tone display in the image processing unit (not shown). Further, the print signal is converted into a laser modulation signal. In the laser modulation signal, light intensity of the laser beam emitted from the later-mentioned semiconductor laser element of the optical beam scanning device 21 is changed to either the intensity, in which the electrostatic latent image can be recorded on the outer surface of the photosensitive drum 23 to which the predetermined surface potential is imparted with the charging device 24, or the intensity in which the electrostatic latent image is not recorded.

The intensity modulation is performed according to the laser modulation signal in each of the later-mentioned semiconductor laser elements of the optical beam scanning device 21, and the semiconductor laser element emits the light so as to record the electrostatic latent image at a predetermined position of the photosensitive drum 23 corresponding to the predetermined image data. The light beam from the semiconductor laser element is deflected toward the first direction similar to a read line of the scanner unit 10 by the later-mentioned deflection device in the optical beam scanning device 21, and the predetermined position X on the outer surface of the photosensitive drum 23 is irradiated with the light beam.

Then, like the movements along the original plate 7 of the first carriage 11 and the second carriage 12 in the scanner unit 10, the photosensitive drum 23 is rotated at a constant speed in the arrow direction, which allows the outer surface of the photosensitive drum 23 to be exposed in each line at predetermined intervals with the laser beam from the semiconductor laser element sequentially deflected by the deflection device.

Thus, the electrostatic latent image is formed on the outer surface of the photosensitive drum 23 according to the image signal.

The electrostatic latent image formed on the outer surface of the photosensitive drum 23 is developed by the toner from the developing device 25. The developed image is conveyed to a position opposing to the transfer device 26 by the rotation of the photosensitive drum 23, and the developed image is transferred to the recording sheet P by the electric field from the transfer device 26. The one recording sheet P is taken out from a sheet cassette 29 by a sheet feed roller 30 and a separation roller 31, and the recording sheet P is supplied at timing which is adjusted by an aligning roller 32.

The recording sheet P to which the toner image is transferred is separated along with the toner by the separation device 27, and the recording sheet P is guided to a fixing device 34 by the conveying device 33.

In the recording sheet P guided to the fixing device 34, the toner (toner image) is fixed by heat and pressure from the fixing device 34. Then, the recording sheet P is discharged to a tray 36 by a sheet discharge roller 35.

On the other hand, after the toner (toner image) is transferred to the recording sheet P by the transfer device 26, the photosensitive drum 23 opposes to the cleaning device 28 as a result of the continuous rotation, the transfer residual toner (remaining toner) on the outer surface is removed, and the photosensitive drum 23 is returned to the initial state before the surface potential is supplied with the charging device 24, which enables the next image formation.

The continuous image formation action can be performed by repeating the above processes.

Thus, in the original D set in the original glass plate 15, the image information is read with the scanner unit 10, and the read image information is converted into the toner image and output to the recording sheet P with the printer unit 20, which allows the copy to be made.

In the above image forming apparatus, the digital copying machine is described by way of example. For example, the invention can be applied to the printer apparatus with no image reading unit.

Then, a detailed configuration of the optical beam scanning device 21 shown in FIG. 1 will be described with reference to FIG. 2.

Figure 2:
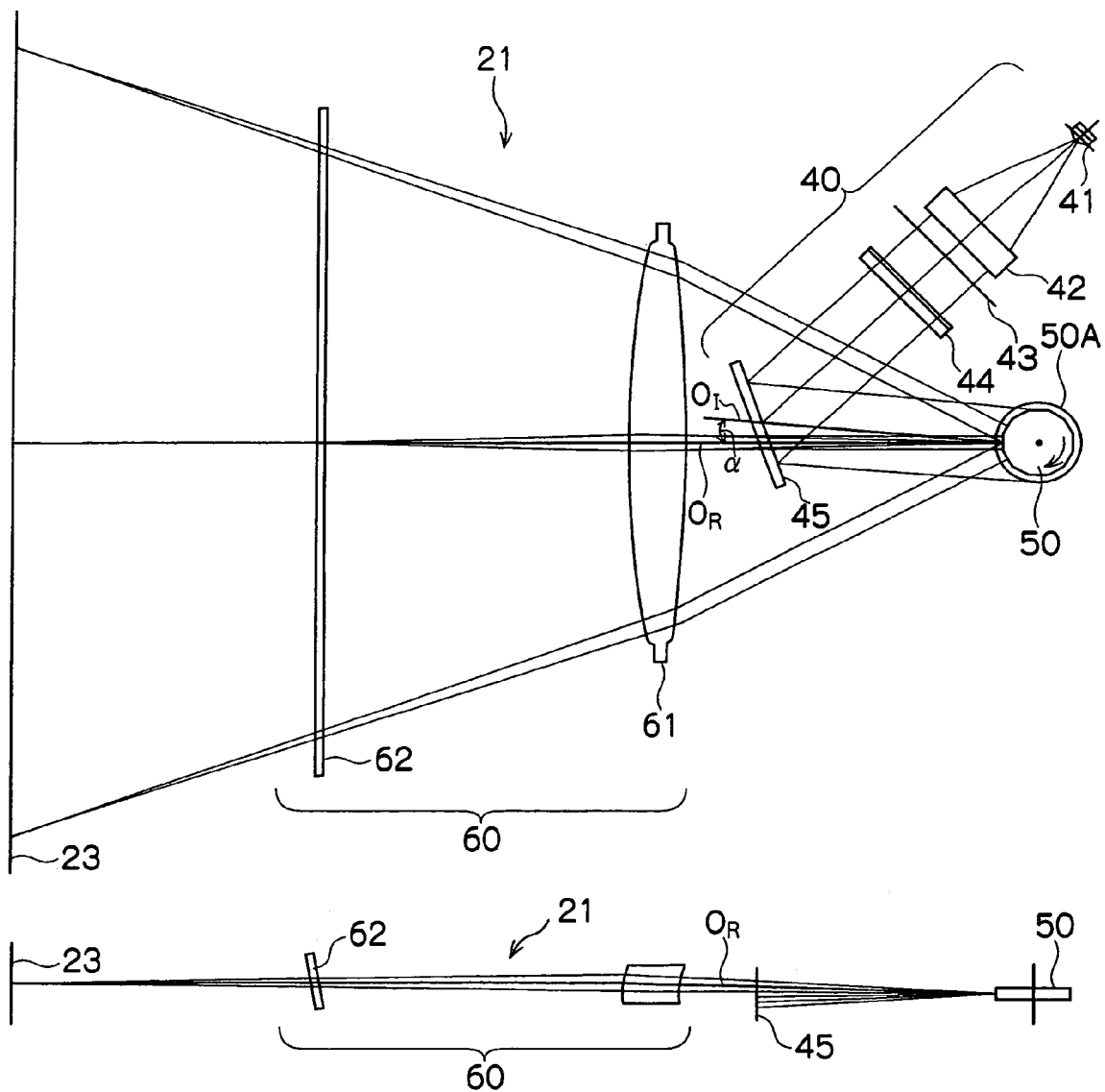
FIG. 2 is a schematic diagram showing a configuration of the optical beam scanning device of the embodiment.

FIG. 2 is a schematic diagram explaining the configuration of the optical beam scanning device 21 shown in FIG. 1. FIG. 2A is a schematic plan view when the folding by the mirror is developed while optical elements arranged between the light source (semiconductor laser element) and the photosensitive drum (scanning subject) which are included in the optical beam scanning device 21 are viewed from the direction orthogonal to the main scanning direction (first direction), which is parallel to the direction in which the light beam from the light deflection device (polygon mirror) toward the photosensitive drum is scanned by the light deflection device. FIG. 2B is a schematic sectional view in which the sub-scanning direction (second direction) orthogonal to the direction shown in FIG. 2, i.e., the main scanning direction becomes a plane.

As shown in FIG. 2A and FIG. 2B, the optical beam scanning device 21 has a pre-deflection optical system 40. The pre-deflection optical system 40 includes a semiconductor laser element (light source) 41, a lens 42, an aperture 43, a cylindrical lens 44, and a mirror 45. The semiconductor laser element 41 emits the laser beam (light beam) L having, e.g., a wavelength of 780 nm. The lens 42 converts a cross-sectional beam shape of the laser beam L emitted from the semiconductor laser element 41 into a focused light beam, a parallel light beam, or a divergent light beam. The aperture 43 limits a light quantity (light flux width) of the laser beam L transmitted through the lens 42 to a predetermined size. Positive power is imparted to the cylindrical lens 44 only in the sub-scanning direction in order to arrange the cross-sectional beam shape of the laser beam L, in which the light quantity is limited by the aperture 43, in a predetermined cross-sectional beam shape. The mirror 45 folds the laser beam L, in which the cross-sectional shape is arranged in the predetermined cross-sectional beam shape by the finite focal point lens or collimate lens 42, the aperture 43, and the cylindrical lens 44, from the semiconductor laser element 41 toward the predetermined direction.

A polygon mirror (light deflection device) 50 is provided in the direction in which the laser beam L, to which the predetermined cross-sectional beam shape is imparted by the pre-deflection optical system 40, progresses. The polygon mirror 50 is integrated with a polygon mirror motor 50A rotated at constant speed. The polygon mirror 50 scans the laser beam L, in which the cross-sectional beam shape is arranged in the predetermined shape by the cylindrical lens 44, toward the photosensitive drum (scanned surface) 23 located in a post-step.

An imaging optical system 60 is provided between the polygon mirror 50 and the photosensitive drum 23. The imaging optical system 60 images the laser beam L, continuously reflected from the reflection planes of the polygon mirror 50, in a substantially linear shape along an axial line direction of the photosensitive drum 23.

The imaging optical system 60 includes an imaging lens (usually referred to as fθ lens) 61 and a dust-proof glass 62. The imaging lens 61 irradiates one end to the other end in a longitudinal direction (axial line) of the photosensitive drum 23 at the exposure position X shown in FIG. 1 with the laser beam L continuously reflected from the reflection planes of the polygon mirror 50 while the position on the photosensitive drum 23 is proportioned to a rotating angle of each reflection plane of the polygon mirror 50 in irradiating the photosensitive drum 23. The imaging lens 61 can provide a convergent property in which a predetermined correlation is given based on the rotated angle of the polygon mirror 50 such that a predetermined cross-sectional beam diameter is obtained at any position in the longitudinal direction on the photosensitive drum 23. The dust-proof glass 62 prevents the toner, dust, paper dust and the like, which are suspended in the image forming unit 22, from running around into a housing (not shown) of the image forming unit 22.

An optical path of the laser beam L from the semiconductor laser element 41 in the optical beam scanning device 21 to the photosensitive drum 23 is folded by the plurality of mirrors (not shown) and the like in the housing (not shown) of the optical beam scanning device 21. The imaging lens 61 and at least one of the mirrors (not shown) may integrally be formed by optimizing curvatures in the main scanning direction and sub-scanning direction of the imaging lens 61 and the optical path between the polygon mirror 50 and the photosensitive drum 23.

In the optical beam scanning device 21 shown in FIG. 2A, an angle α formed by an axis $O_I$ and an optical axis $O_R$ of the imaging optical system 60 is 5° when the axis $O_I$ and the optical axis $O_R$ are projected onto the main scanning plane, where the axis $O_I$ is located along a principal ray of the incident laser beam orientated toward each reflection plane of the polygon mirror 50. A scanning angle β is 26.426°. Referring to FIG. 2B, an angle formed by the axis $O_I$ of the principal ray of the incident laser beam and the optical axis $O_R$ of the imaging optical system 60 is 2° when viewed from the sub-scanning cross-section of the axis $O_I$ and the optical axis $O_R$.

Figure 3:
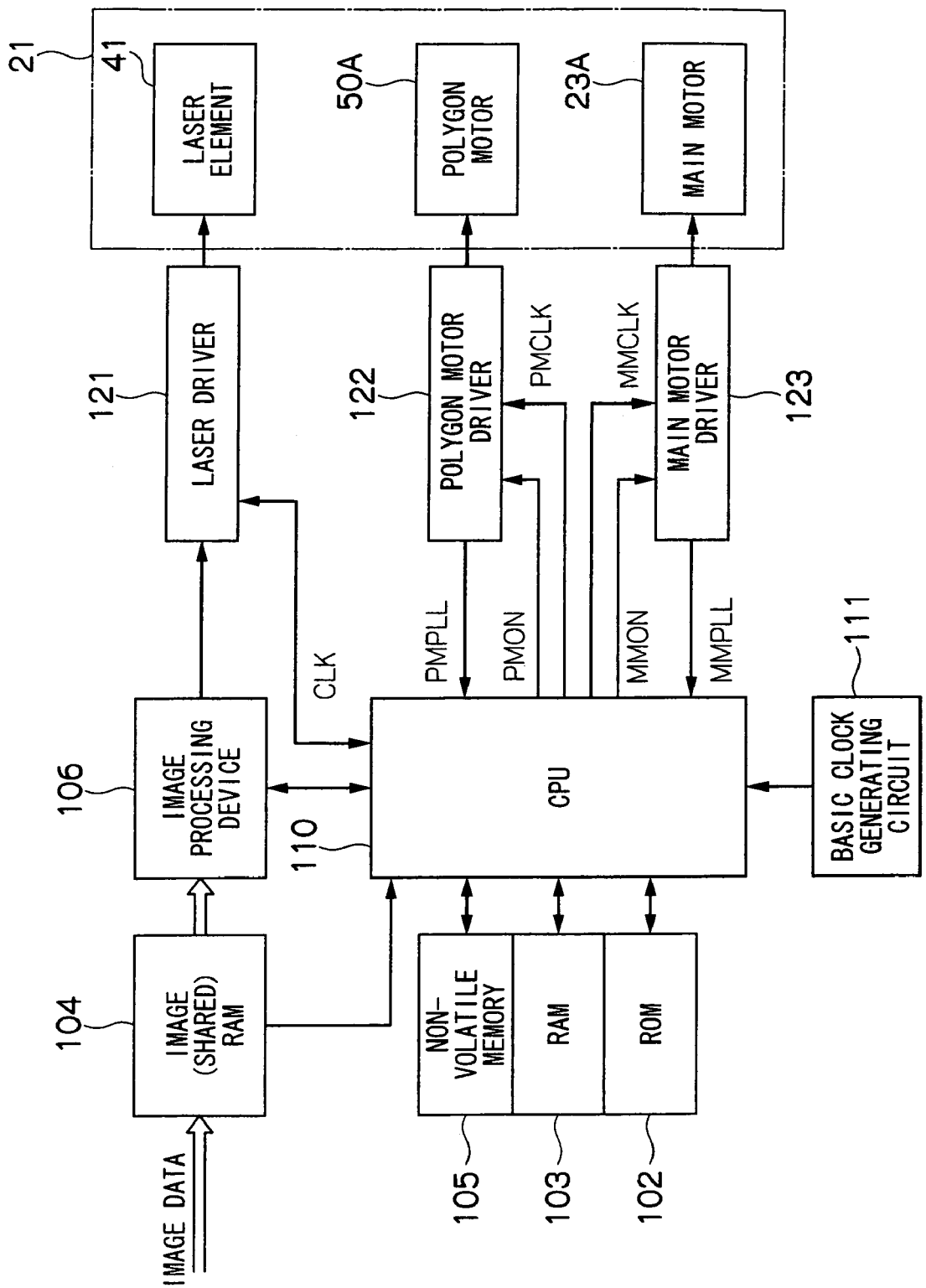
FIG. 3 is a schematic block diagram showing a configuration example of a drive circuit in the image forming apparatus of the embodiment.

The optical beam scanning device 21 shown in FIG. 2 is driven by a drive circuit of the digital copying machine 1 as shown in FIG. 3. FIG. 3 is a schematic block diagram showing an example of the drive circuit of the digital copying machine including the optical beam scanning device shown in FIG. 2.

A ROM (Read Only Memory) 102, a RAM 103, a shared (image) RAM 104, an NVM (Non-Volatile Memory) 105, an image processing device 106, and the like are connected to a CPU 110 which is of a main control device. A predetermined operating rule and initial data are stored in the ROM 102. Inputted control data is tentatively stored in the RAM 103. While the shared RAM 104 holds the image data from the CCD sensor 14 or the image data supplied from the external device, the shared RAM 104 outputs the image data to an image processing circuit shown below. The NVM 105 can hold the pieces of data stored until that time by battery backup even if the passage of electric current through the digital copying machine 1 is interrupted. The image processing device 106 performs predetermined image processing to the image data stored in the image RAM 104, and the image processing device 106 outputs the image data to a laser driver described below.

A laser driver 121, a polygon motor driver 122, a main motor driver 123, and the like are also connected to the CPU 110. The laser driver 121 emits the semiconductor laser element 41 in the optical beam scanning device 21. The polygon motor driver 122 drives the polygon motor 50A which rotates the polygon mirror 50. The main motor driver 123 drives a main motor 23A for driving the photosensitive drum 23, a conveying mechanism of the attendant recording sheet (transferred material), and the like.

In the optical beam scanning device 21 shown in FIG. 2, the divergent laser beam L, emitted from the semiconductor laser element 41, whose cross-sectional beam shape is converted into the focusing light, the parallel light, or the divergent light by the lens 42 under the drive control by the drive circuit shown in FIG. 3.

The laser beam L whose cross-sectional beam shape is converted into the predetermined shape is passed through the aperture 43 to optimally set the light flux width and the light quantity, and a predetermined convergent property is imparted in the sub-scanning direction by the cylindrical lens 44. Therefore, the laser beam L becomes the linear shape which is extended in the main scanning direction on each reflection plane of the polygon mirror 50.

For example, the polygon mirror 50 is a regular dodecahedron, and the polygon mirror 50 is formed such that an inscribed circle diameter Dp of the regular dodecahedron is set at 29 mm. Assuming that the number of reflection planes of the polygon mirror 50 is N, a width Wp in the main scanning direction of each reflection plane (twelve planes) of the polygon mirror 50 can be determined from the following equation:

$$Wp = \tan(\pi/N) \times Dp \quad (2)$$

In this case, $$Wp = \tan(\pi/12) \times 29 = 7.77 \text{ mm} \quad (3)$$

On the other hand, a beam width $D_L$ in the main scanning direction of the laser beam L with which each plane of the polygon mirror 50 is irradiated is substantially 32 mm, and the beam width $D_L$ is set broader when compared with the width Wp=7.77 mm in the main scanning direction of each reflection plane of the polygon mirror 50. As the beam width becomes broader in the main scanning direction, variations in light quantity are decreased at a scanning end and a scanning center in an image surface.

In the laser beam L, which is guided to each reflection plane of the polygon mirror 50 and scanned (deflected) in linear by the continuous reflection by the rotation of the polygon mirror 50, a predetermined imaging property is imparted by the imaging lens 61 of the imaging optical system 60 such that the cross-sectional beam diameter becomes substantially even with respect to the main scanning direction on the photosensitive drum 23 (image surface). Then, the laser beam L is imaged in the substantially linear shape on the surface of the photosensitive drum 23.

The correction is performed by the imaging lens 61 such that a proportional relationship holds between the rotation angle of each reflection plane of the polygon mirror 50 and the imaging position, i.e. the scanning position of the light beam imaged on the photosensitive drum 23. Accordingly, the speed of the laser beam linearly scanned on the photosensitive drum 23 by the imaging lens 61 becomes constant in all the scanning areas. The curvature (sub-scanning direction curvature) which can correct the scanning position shift in the sub-scanning direction is imparted to the imaging lens 61. The scanning position shift is caused by non-parallelism of the reflection planes of the polygon mirror 50 in the sub-scanning direction, i.e., generation of slants of the reflection planes.

The imaging lens 61 also corrects a curvature of field in the sub-scanning direction. In order to correct these optical properties, the curvature in the sub-scanning direction is changed according to the scanning position.

At this point, the shape of the lens surface of the imaging lens 61 is defined by, e.g., TABLE 1 and Equation (4).

TABLE 1

$$X = \frac{CUY * y^2 + CUZ * z^2}{1 + \sqrt{1 - AY * CUY^2 * y^2 - AZ * CUZ^2 * z^2}} + \sum_{n=0}\sum_{M=0} A_{mn} y^m z^{2n} \quad (4)$$

where y indicates the main scanning direction, z indicates the sub-scanning direction, and x indicates the optical axis direction.

A rotation angle θ of each reflection plane of the polygon mirror 50 is substantially proportioned to the position of the laser beam L imaged on the photosensitive drum 23 with the imaging lens 61, so that the position of the laser beam L can be corrected in imaging the laser beam L on the photosensitive drum 23.

Further, the imaging lens 61 can correct the position shift in the sub-scanning direction, which is caused by an inclination deviation in the sub-scanning direction, i.e., the variation in slant amount of the reflection planes of the polygon mirror 50. Specifically, in a laser beam incident plane (polygon mirror 50 side) and an outgoing plane (photosensitive drum 23 side) of the imaging lens 61, even if gradients defined between an arbitrary reflection plane of the polygon mirror 50 and the rotation axis of the polygon mirror 50 differ from one another (the gradient is different in each reflection plane), the scanning position shift in the sub-scanning direction of the laser beam L guided onto the photosensitive drum 23 can be corrected by substantially forming an optically conjugate relationship.

The cross-sectional beam diameter of the laser beam L depends on the wavelength of the laser beam L emitted from the semiconductor laser element 41. Therefore, the wavelength of the laser beam L is set at 650 nm or 630 nm, or a shorter wavelength, which allows the cross-sectional beam diameter of the laser beam L to be further decreased.

The post-deflection mirror is formed by a flat plane. That is, the plane slant correction is performed only by the imaging lens 61.

The lens which has a rotational symmetry axis with respect to the main scanning axis and in which the curvature in the sub-scanning direction is changed by the scanning position may be used in the surface shape of the imaging lens, e.g., a toric lens may be used. A cyclic olefin resin is used as the material of the imaging lens 61.

Figure 4:
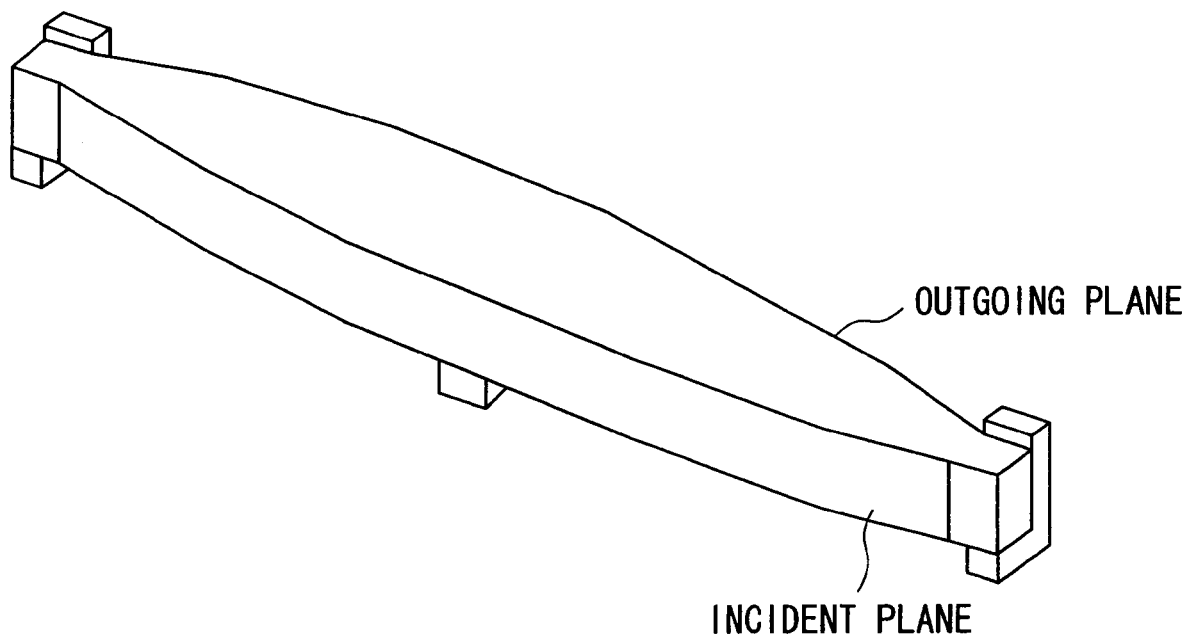
FIG. 4 is a view showing a method of fitting an imaging lens of the embodiment.

FIG. 4 is a view showing a method of fitting the imaging lens 61. In FIG. 4, in order to fit the imaging lens 61, there is a housing portion to which the imaging lens 61 is fitted. As shown in FIG. 4, the imaging lens 61 has fitting surfaces at end faces in the longitudinal direction, and the fitting surfaces are aligned with contact surfaces of the housing portion, which allows the imaging lens 61 to be arranged in place while maintaining a desired positional relationship. Further, as shown in FIG. 4, a member which supports the lens from below is provided, and the imaging lens 61 is supported by the member. Examples of the fixing method include a method of pressing the lens against the contact surfaces of the housing portion by elastic deformation force of a plate spring and a method of bonding the lens to the contact surfaces of the housing portion.

In the case where one imaging lens 61 is used in the imaging optical system 60, because the section thickness of the imaging lens 61 is increased, the imaging lens fluctuation amount is increased, which often worsens the optical property of the imaging lens 61. This point will be described below with reference to FIG. 5 to FIG. 7.

Figure 5:
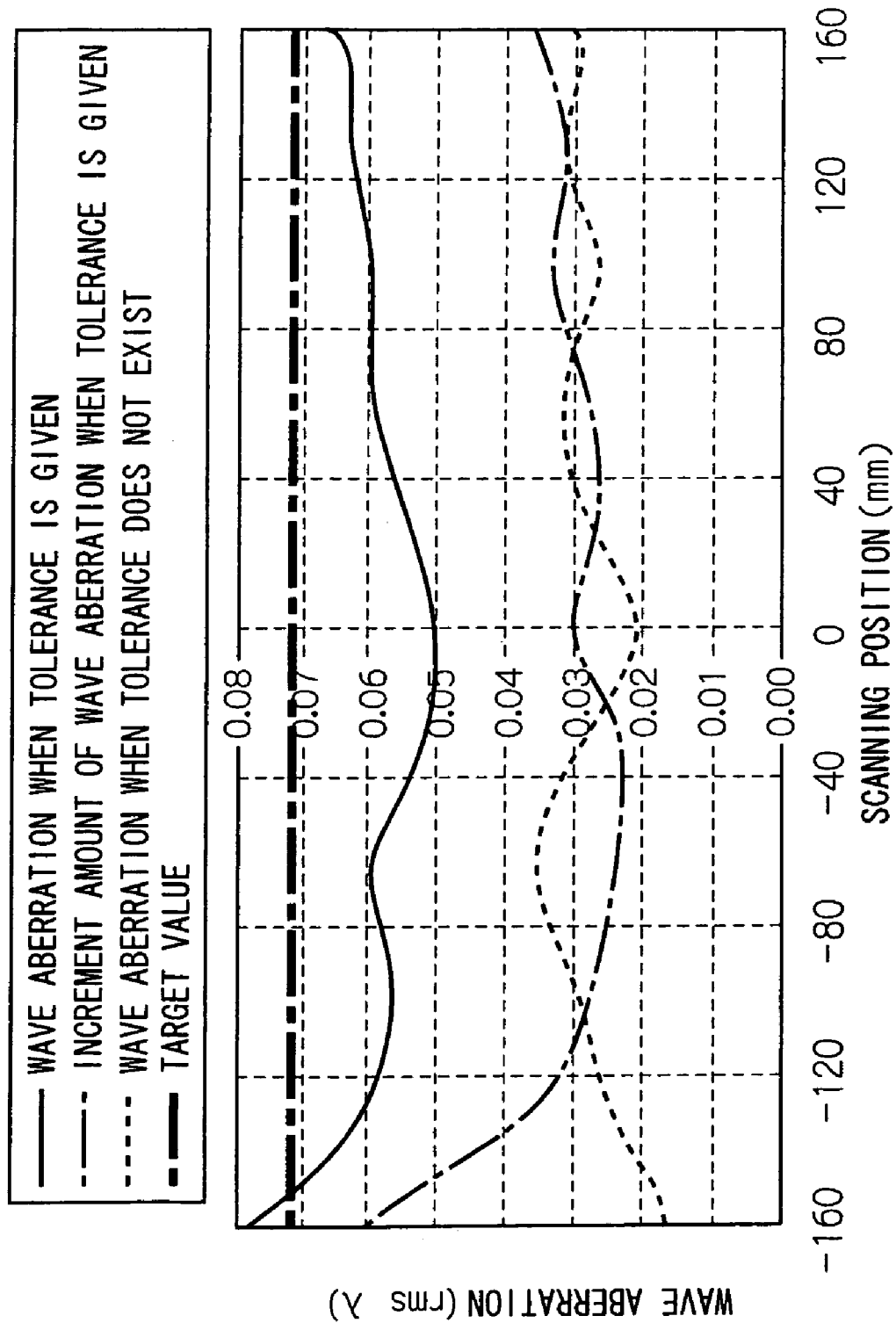
FIG. 5 is a view showing a relationship between a scanning position and a wave aberration of the embodiment.

FIG. 5 is a view showing a wave aberration when the conventional optical components are arranged in the imaging optical system 60.

FIG. 5 shows the wave aberration in the case of no tolerance in each optical component (wave aberration amount of design value), the increased wave aberration amount in the case a predetermined tolerance is given, and the amount in which the increased amount is added to the wave aberration amount of the design value.

At this point, in the tolerance amount given to the optical component, it is assumed that position accuracy between the incident plane and the outgoing plane of the imaging lens surfaces is set at 20 μm and a fitting error of each optical component is set at 50 μm, and the tolerance analysis is performed. An rss method is adopted as the tolerance analysis method.

Further, the fitting position of the imaging lens 61 to the housing is arranged such that Li/Lo is 0.2.

Figure 6:
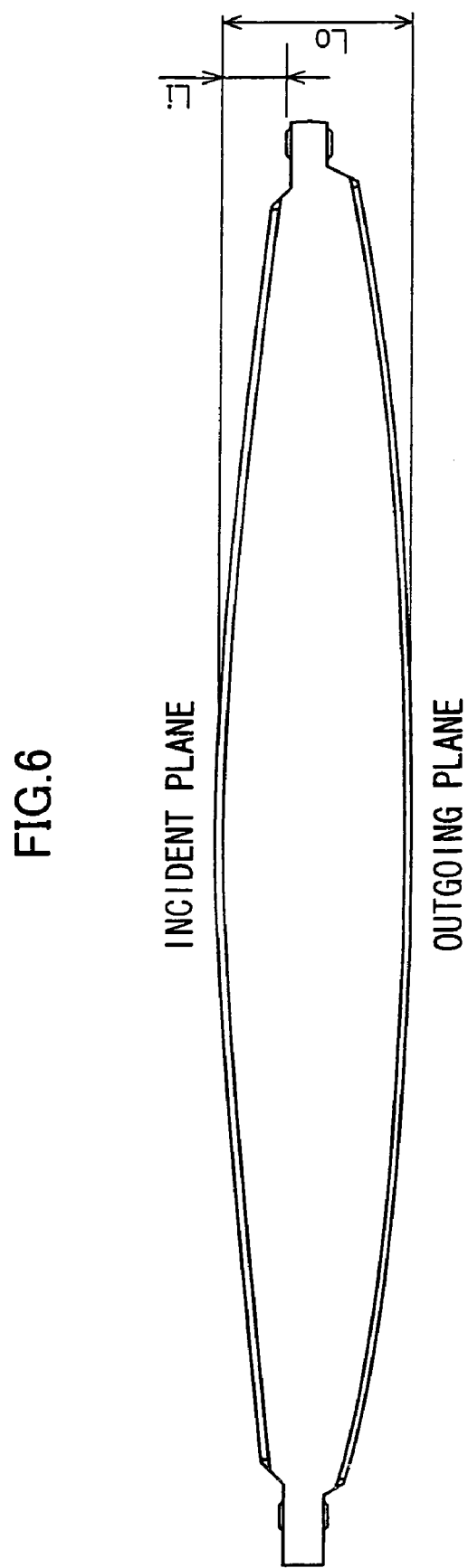
FIG. 6 is a view explaining a positional relationship for determining a position of a fitting surface of the imaging lens of the embodiment.

As shown in FIG. 6, Li is the distance between a vertex of an incident plane of the imaging lens 61 and a housing fitting alignment surface and Lo is the distance between a vertex of an incident plane of the each lens and the vertex of the outgoing plane.

From a viewpoint of the tolerance analysis result of FIG. 5 under the above conditions, the wave aberration amount is 0.07779λ at the scanning position near −160 mm when the tolerance is given, and it is found that a Marechal criterion of RMS<λ/14 (=0.07142λ) is not satisfied.

Figure 7:
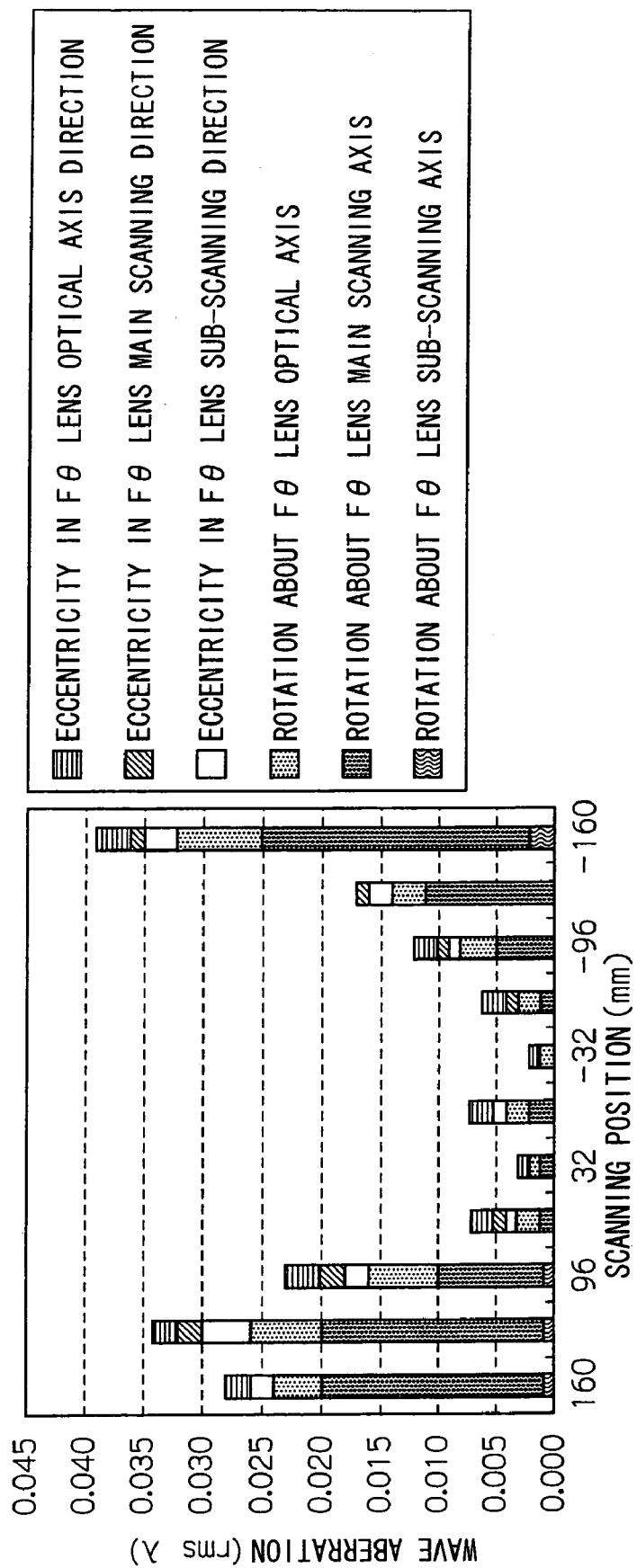
FIG. 7 is a view showing an increment amount of wave aberration when a fitting error of the conventional imaging lens is given.

The cause of the tolerance analysis result will be discussed with reference to FIG. 7. FIG. 7 is a graph in which an increment amount of wave aberration is plotted when a fitting error of the imaging lens 61 is given. As shown in FIG. 7, it is found that a rotation error about the main scanning axis of the imaging lens 61 largely affects a degree of incidence influence (degree of deterioration).

That is, the rotation about the main scanning axis is generated when the lens having the large section thickness is fitted to the housing. At this point, when the lens fitting error is generated, the lens surface fluctuation amount caused by the fitting error becomes large due to the long distance to the lens surface. Therefore, the lens optical property is largely worsened. This is a common phenomenon among the lenses in the imaging optical system. Particularly, when the imaging lens is formed by one lens, there is generated the problem because the section thickness of the lens is thickened.

In the embodiment, the lens is provided such that the distance between the lens fitting surface to the housing and the maximum section thickness portion becomes small, which decreases the influence of the lens fitting error. Therefore, even if the rotation about the main scanning axis is generated, the fluctuation in lens surface can be suppressed to a small amount to decrease the deterioration of the lens optical property.

Figure 8:
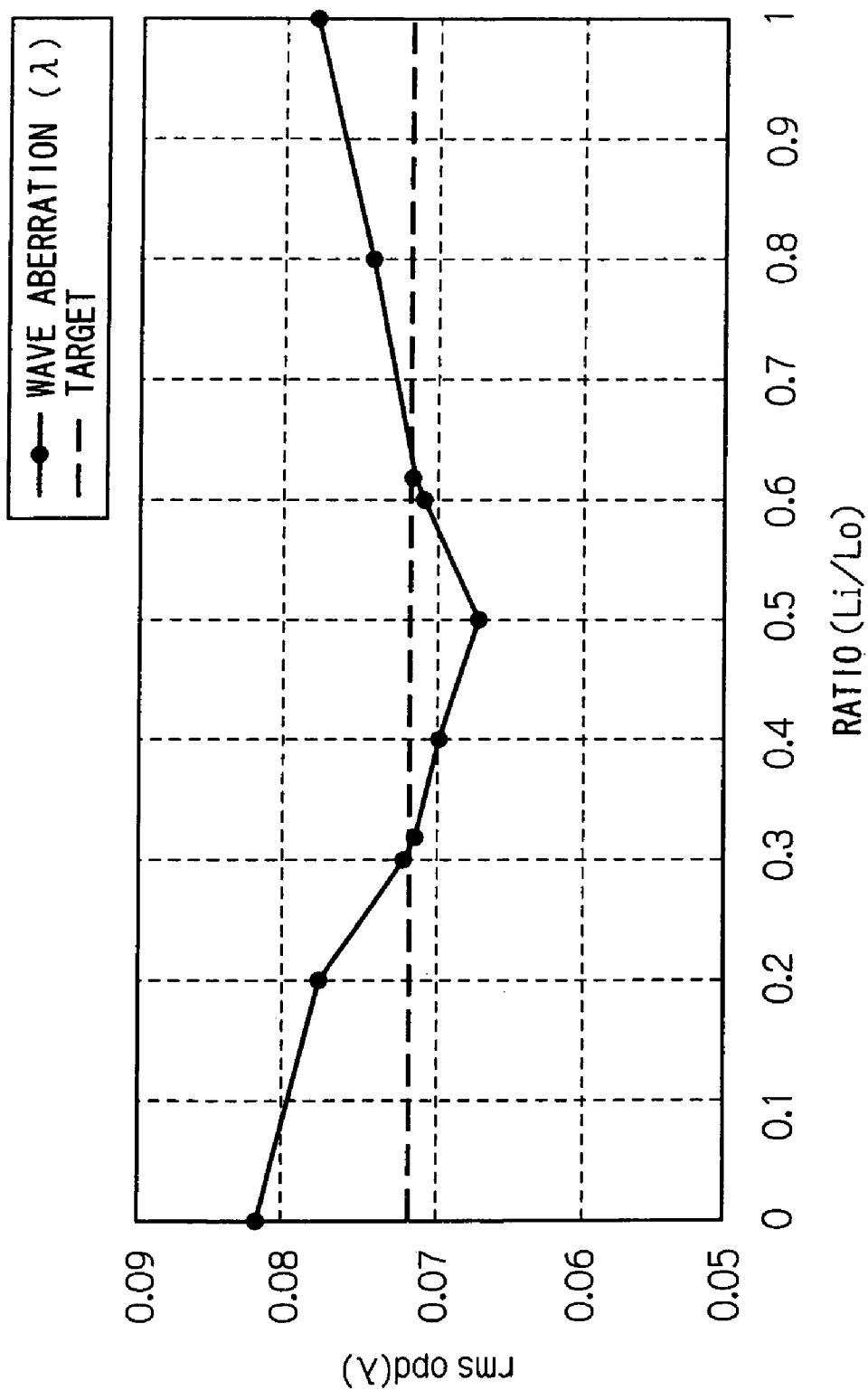
FIG. 8 is a view showing the relationship between the scanning position and the wave aberration of the embodiment.

FIG. 8 shows the tolerance analysis result when a ratio of Li/Lo of the imaging lens 61 is changed. FIG. 8 is a graph in which the maximum value of the wave aberration is plotted when the tolerance is given in the scanning range of −160 mm to +160 mm.

Figure 9:
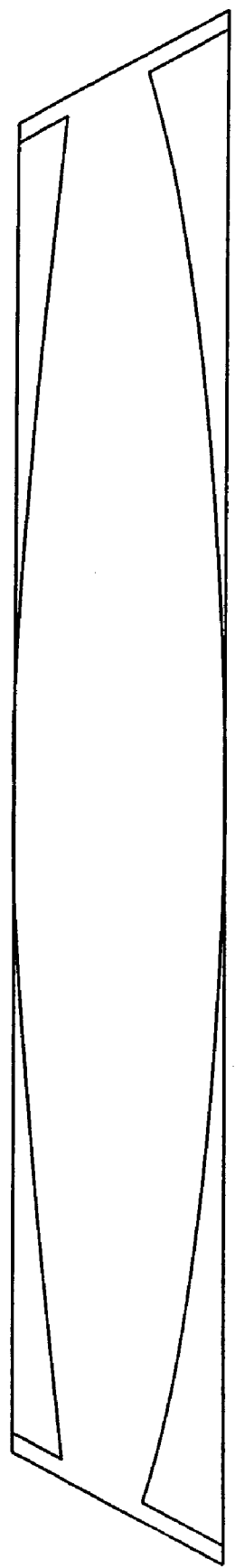
FIG. 9 is a view showing a flange of the embodiment.

In FIG. 8, Li/Lo of 0 and 1 means, e.g., the case in which the flange is provided as shown in FIG. 9. In forming the flange thickness similar to the lens section thickness, Li/Lo becomes 0 when the alignment is performed at the surface on the incident plane of the flange, and Li/Lo becomes 1 when the alignment is performed at the surface on the outgoing plane of the flange.

From the result of FIG. 8, the wave aberration is not more than λ/14 (=0.07142λ), and the Marechal criterion is satisfied when the ratio of Li/Lo is within the range of 0.32≦Li/Lo≦0.62. The lens housing alignment surface is provided within the range of the ratio to arrange the lens, which allows the good optical property to be obtained.

Figure 10:
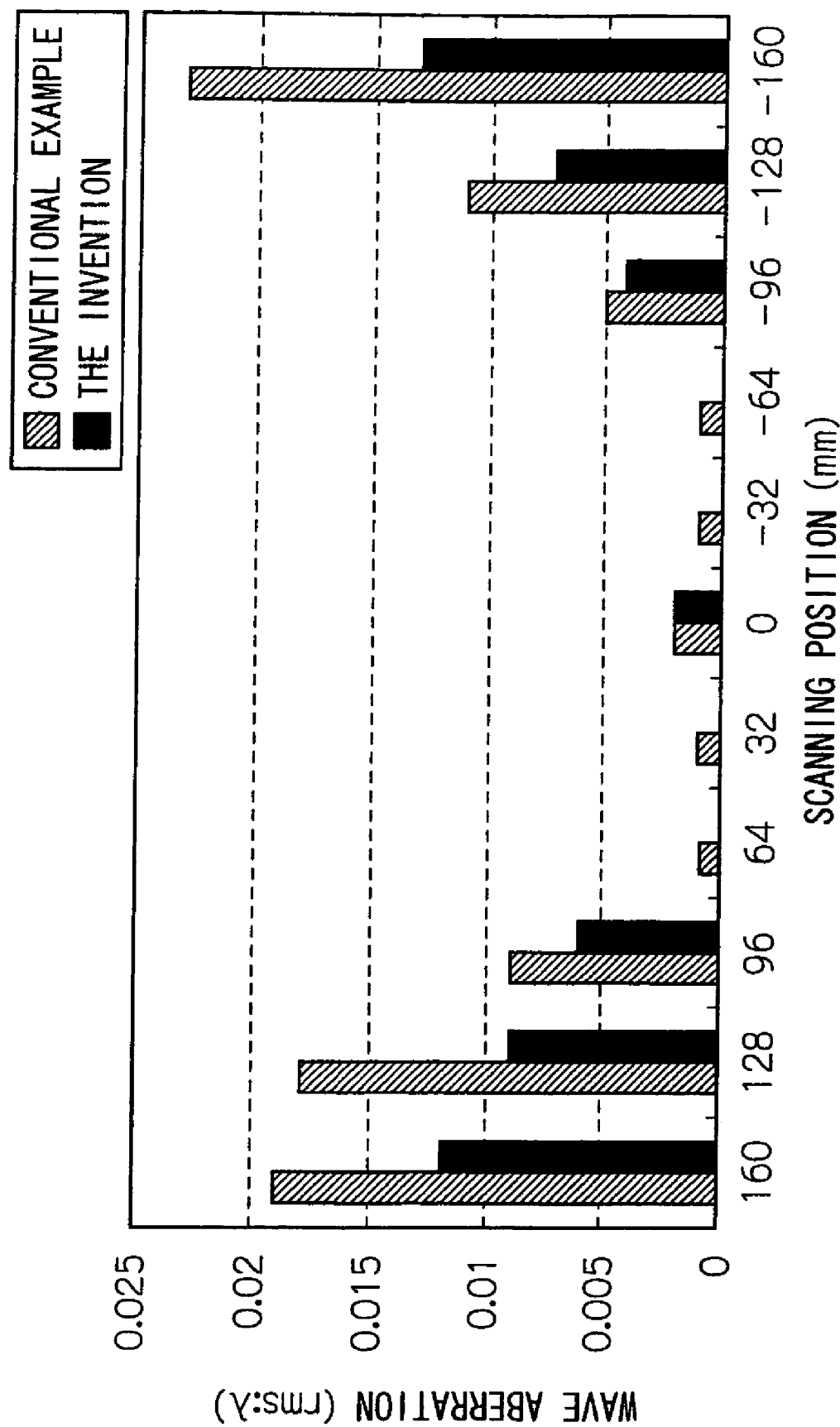
FIG. 10 is a view showing the increment amount of wave aberration when the fitting error of the imaging lens of the embodiment is given.

FIG. 10 is a view comparing the increment amounts of wave aberration for Li/Lo of 0.2 (conventional example) and Li/Lo of 0.5 (the embodiment) when a rotation error about the main scanning axis of the imaging lens 61 is occurred. As shown in FIG. 10, in the result of Li/Lo of 0.5, it is found that the increment amount of wave aberration becomes smaller when compared with the result of Li/Lo of 0.2. That is, when the lens is arranged such that Li/Lo becomes 0.5, the deterioration of the optical property can be decreased.

In the embodiment, the position of the lens fitting alignment surface is determined by changing the ratio of Li/Lo. However, not limited to Li/Lo, the position may be determined by changing the ratio of Li/(Lo−Li) or the ratio of Lo/Lo−Li).

In FIG. 6, Li or Lo is set at the distance between the housing fitting alignment surface closer to the incident plane and the vertex of the incident plane or outgoing plane. However, Li or Lo may be set at the distance between the fitting surface on the side closer to the outgoing plane and the vertex of the incident plane or outgoing plane while the fitting surface on the side closer to the outgoing plane is set at the reference.

TABLE 1

| | | | INCIDENT PLANE | | | |
|---|---|---|---|---|---|---|
| | | CUY | CYZ | | AY | AZ |
| | | −6.19E−03 | −7.12E−03 | | 1 | 1 |

| | | | | m | | | |
|---|---|---|---|---|---|---|---|
| | | 0 | 1 | 2 | 3 | 4 | 5 |
| n | 0 | 0.00E+00 | −1.54E−03 | 1.84E−03 | −2.07E−07 | 1.18E−07 | 5.92E−12 |
| | 1 | 1.34E−02 | −1.25E−06 | −2.09E−07 | −1.37E−10 | 1.11E−10 | −5.79E−14 |
| | 2 | 2.26E−05 | −1.73E−09 | 4.67E−11 | 3.62E−12 | −1.18E−13 | −1.23E−15 |

| | | | m | | | |
|---|---|---|---|---|---|---|
| | | 6 | 7 | 8 | 9 | 10 |
| n | 0 | −5.89E−12 | −2.33E−15 | 3.31E−16 | −1.28E−19 | −1.93E−20 |
| | 1 | −8.30E−15 | −1.04E−17 | 4.72E−19 | 1.31E−21 | 2.24E−23 |
| | 2 | 2.14E−17 | −3.94E−21 | 8.65E−21 | 1.92E−23 | −1.93E−25 |

TABLE 1-continued

| | OUTGOING PLANE | | |
|---|---|---|---|
| CUY | CYZ | AY | AZ |
| 3.28E−03 | 2.76E−02 | 1 | 1 |

| | | m=0 | m=1 | m=2 | m=3 | m=4 | m=5 |
|---|---|---|---|---|---|---|---|
| n | 0 | 0.00E+00 | −1.69E−03 | −9.88E−04 | −1.85E−07 | 6.45E−08 | −6.44E−12 |
|   | 1 | 3.37E−03 | −7.72E−07 | −4.14E−07 | −2.46E−10 | 6.75E−11 | 2.42E−14 |
|   | 2 | 5.30E−06 | 7.69E−10 | 4.85E−10 | 2.42E−13 | 1.44E−13 | 1.32E−16 |

| | | m=6 | m=7 | m=8 | m=9 | m=10 |
|---|---|---|---|---|---|---|
| n | 0 | −3.12E−12 | 3.44E−16 | 1.40E−16 | −3.37E−19 | −1.74E−20 |
|   | 1 | −1.50E−15 | −1.30E−17 | −1.04E−19 | 3.36E−22 | 4.27E−23 |
|   | 2 | −2.28E−17 | −1.32E−19 | 3.18E−21 | 1.54E−23 | 3.40E−25 |

What is claimed is:

1. An optical beam scanning device, comprising:

a light deflection device;

a pre-deflection optical system which causes a light beam emitted from a light source to be incident to the light deflection device; and a post-deflection optical system which images the light beam, reflected from the light deflection device, onto a scanned surface, wherein an alignment surface to which the lens is fitted is located near a main scanning direction line passing through a midpoint of a maximum section thickness of the lens in at least one lens in one or the plurality of lenses constituting the post-deflection optical system, wherein the alignment surface to which the lens is fitted is located within the following range:

$0.32 \leq Li/Lo \leq 0.62$ where $Li$ is a distance between a vertex of an incident plane of said each lens and the alignment surface and $Lo$ is a distance between a vertex of an incident plane of the each lens and a vertex of an outgoing plane of the each lens, wherein said each lens constituting the post-deflection optical system is made of plastic, wherein said each lens constituting the post-deflection optical system is formed by one lens, wherein a width in a main scanning direction of light flux of the light beam incident to the light deflection device is broader than a width in the main scanning direction of a single reflection plane of the light deflection device.

2. An image forming apparatus, comprising an optical beam scanning device, a photosensitive body in which an image is formed by a light beam scanned by the optical beam scanning device, and a developing device which develops the image formed on the photosensitive body, wherein the optical beam scanning device includes:

a light deflection device;

a pre-deflection optical system which causes a light beam emitted from a light source to be incident to the light deflection device; and a post-deflection optical system which images the light beam, reflected from the light deflection device, onto a scanned surface, and an alignment surface to which the lens is fitted is located near a main scanning direction line passing through a midpoint of a maximum section thickness of the lens in at least one lens in one or the plurality of lenses constituting the post-deflection optical system, wherein the alignment surface to which the lens is fitted is located within the following range:

$0.32 \leq Li/Lo \leq 0.62$ where $Li$ is a distance between a vertex of an incident plane of said each lens and the alignment surface and $Lo$ is a distance between a vertex of an incident plane of the each lens and a vertex of an outgoing plane of said each lens, wherein said each lens constituting the post-deflection optical system is made of plastic, wherein said each lens constituting the post-deflection optical system is formed by one lens, wherein a width in a main scanning direction of light flux of the light beam incident to the light deflection device is broader than a width in the main scanning direction of a single reflection plane of the light deflection device.

* * * * *